United States Patent [19]

Kohaut

[11] Patent Number: 4,477,694
[45] Date of Patent: Oct. 16, 1984

[54] THROUGH-FLOOR ELECTRICAL OUTLET FITTING

[75] Inventor: John E. Kohaut, 10 Hepworth Pl., West Orange, N.J. 07052

[73] Assignees: John E. Kohaut, West Orange; Raceway Components, Inc., Nutley, both of N.J.

[21] Appl. No.: 346,415

[22] Filed: Feb. 8, 1982

[51] Int. Cl.³ .............................................. H02G 3/22
[52] U.S. Cl. ........................................ 174/48; 169/48
[58] Field of Search ............... 174/48, 53, 58; 169/48; 248/27.1; 220/3.5, 3.6, 3.9

[56] References Cited

U.S. PATENT DOCUMENTS

| | | | |
|---|---|---|---|
| 3,614,144 | 10/1971 | Hodges | 174/58 X |
| 3,995,102 | 11/1976 | Kohaut | 174/48 |
| 4,062,512 | 12/1977 | Arnold | 220/3.9 X |
| 4,088,827 | 5/1978 | Kohaut | 174/48 |
| 4,091,231 | 5/1978 | Sotolongo | 174/48 |
| 4,243,835 | 1/1981 | Ehrenfels | 174/48 |
| 4,264,779 | 4/1981 | Rhodes et al. | 174/48 |
| 4,323,723 | 4/1982 | Fork et al. | 174/48 |
| 4,323,724 | 4/1982 | Shine | 174/48 |
| 4,336,416 | 6/1982 | Goodsell | 174/48 |

Primary Examiner—John Gonzales
Assistant Examiner—D. A. Tone
Attorney, Agent, or Firm—Howard N. Sommers

[57] ABSTRACT

A through-floor electrical outlet fitting, for insertion into structural openings of minimum diameter. The device has means for interlocking with and conforming to such openings, and to those of a wide range of thicknesses, for locking the device in the opening. Raceway means in the device separate passage therethrough and transfer of electrical service cables for at least two different electrical functions or services, such as high and low voltage insulated cables. The device has intumescent means thereon, encircling the cable raceways to conform the length thereof to varying depths of structural openings, as fire rated insulating barriers, so disposed that there is no need for a multiplicity of devices or field adjustments for varying depths of structural openings. The device and above-floor service head portions are capable of accepting maximum size low voltage communication cables, through the use of a radiator separately mounted in the service head, to allow dissipation of heat to a non-sensitive area.

8 Claims, 19 Drawing Figures

THROUGH-FLOOR ELECTRICAL OUTLET FITTING

BACKGROUND OF THE INVENTION

Expanding use of through-floor fire rated devices in buildings has created a need for improved insert devices, adaptable for insertion into openings formed into concrete floors of a range of diameters from minimal to larger sized openings. Such devices should be adapted for passage separately, through the entire length thereof, of cables for different cable uses, such as high and low voltage insulated cables, such openings of minimal and larger diameter being also of varying depths according to the needs of the particular installation. It is further desirable that the insert device be formed as a standard unit for use equally well in a range of installations.

Although prior devices could physically handle maximum sizes of cables, they were fire tested and approved for use with specific sizes and numbers of cables, which could lead to users of the device violating the actual capabilities of the device. Further, the specifications for such devices have heretofore necessitated stocking a large range of such devices of different sizes and dimensions, for varying depths of concrete, and functions of the service head, greatly increasing costs, multiplying the chance of error in installation, and entailing substantial safety risks through errors as to sizes and parts.

Still further, the drilling of larger holes has an obvious effect on the structure, since more concrete is removed, and larger devices incorporate more metal and therefore have more thermal conductivity. Prior devices require the telephone installer to feed long lengths of cable down through the device and into the plenum area of the floor below, for connection to the telephone panel. This is necessary since the amphenol connector is factory wired to the cable, and due to raceway size cannot be pushed up from below.

The fitting device disclosed and claimed herein overcomes the above recited and other deficiencies of prior devices. Such device comprises a novel "poke-through" fitting, and capable of handling both high tension and a range of low tension cable sizes and quantities sufficient to handle multi-line telephones and more than one office work station in a single unit, and to be secured in minimal hole cored with a 2" diameter drill. The device includes a galvanized complete unit, fire rated due to mechanical design and the use of intumescent organic material to withstand fire conditions, capable of passing an uncoupled multi-pair amphenol connector through its entire body for use in core holes of various depths. While mechanically sound, the present device uses less metal and further breaks thermal conductivity by separation of metal parts by the intumescent barriers.

The poke-through floor outlet device disclosed and claimed herein is of novel concept and design. Installed in a 2" hole, it highly exceeds the communication carrying capacity of existing fittings. It has a communication raceway large enough to pass an uncoupled multi-unit amphenol connector through its entire length, and the 2" hole diameter lessens the possibility of reducing the structural capacity of the floor. Thus core drilling costs are drastically reduced while future expansion capability is realistically provided for in a single-length unit, suiting normal floor thicknesses without extra extensions, enabling rapid, self-centering installation, easy removability, power/communication separation, floating service head, and other features below described, not heretofore available in combination in such fittings. A radiator allows the installation of 1-100 pair telephone cable.

DESCRIPTION OF THE DRAWINGS

In the drawings, showing exemplary forms of the invention, similar reference characters indicate like parts.

DESCRIPTION OF PREFERRED FORM OF THE INVENTION

A preferred form of the invention, as shown in the drawings (FIGS. 1 and 4) comprises raceway sections 10 and 12, defining separate passageways 14 and 16 therethrough of at least two different types or classes of, for example, and without limitations, power and telephone cables, separated by barrier 18 against risk of contact between such different purpose cables and wires for their further protection. The raceway 10 is formed with scored-line increments 20 at the lower end thereof (FIG. 1) to allow for sawing off, enabling adjustment in length of the raceway to conform to the particular installation. The raceway section 12 is formed with a cut-out section 19 extending circumferentially thereabout at the upper end thereof from one side of barrier 18 to the other. The floor 22 may be concrete poured on a removable form or poured onto a stay-in-place metal deck 24 (FIG. 1) on which the floor 22 is formed, and may vary in depth according to the particular building plans and installations involved. The device of the invention conforms without adjustment and with a single unit available for normal depths for such variations; it is adapted to be inserted into an opening or hole 26 (dotted, FIG. 8), in floor 22 with line 28 showing one wall of that hole, of small size in the concrete or other structural member 22, and to be locked therein.

Figure 11:
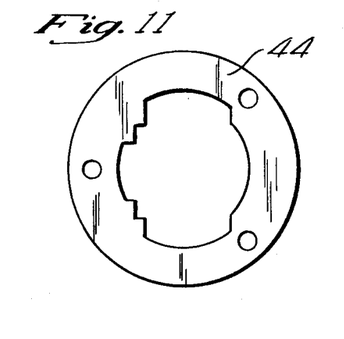
FIG. 11 is a top plan view of an upper slip ring, which may be made of galvanized steel, atop the thermal insulating rings shown in FIGS. 1, 4, and 16 and secured (FIG. 1) by bolts or other means passing through the intumescent rings and connected to a bottom ring.
Figure 12:
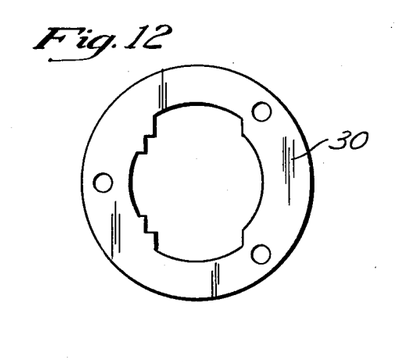
FIG. 12 is a top view of an intumescent ring.
Figure 13:
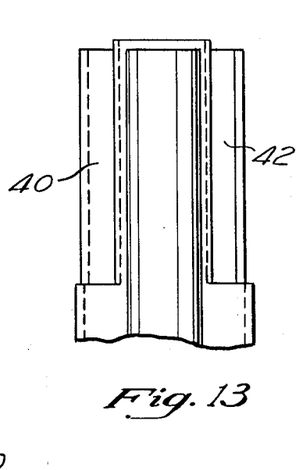
FIGS. 13 and 14 are fragmentary side elevational views of the upper extended rod portion of the body member of the insert device, for allowing the bands 41 and 42 to intumesce into the raceway area and sealing the device in the hole (FIG. 1).
Figure 14:
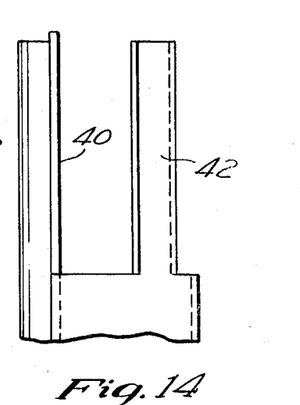
Figure 15:
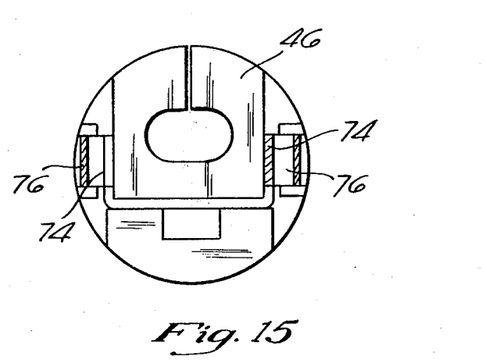
FIG. 15 is a transverse sectional view taken at line 15—15 of FIG. 4.
Figures 16, 17:
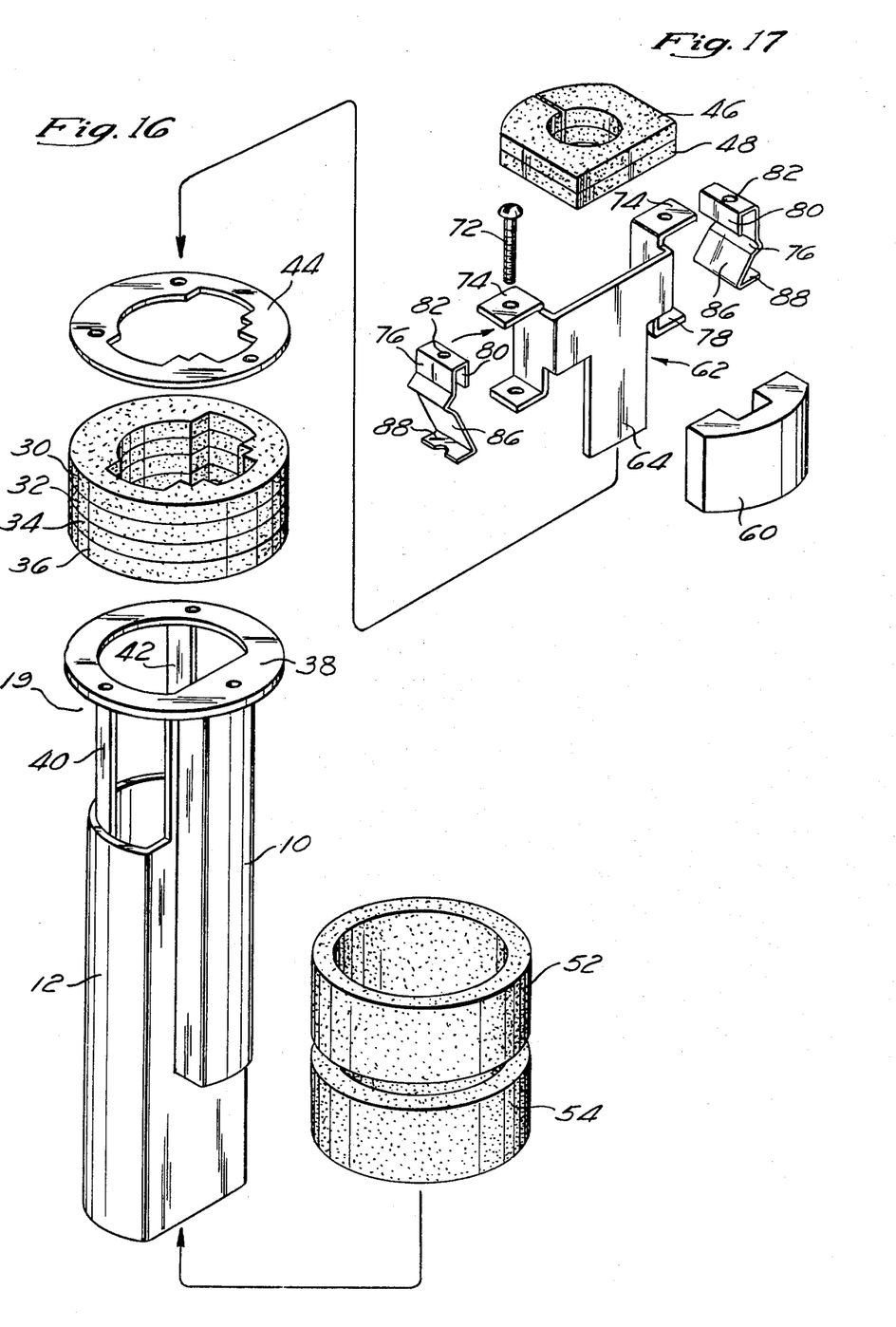
FIG. 16 is an exploded isometric view of the body member of the insert device and associated parts.
FIG. 17 is a similar view of parts at the upper end of the device.

Intumescent rings 30, 32, 34 and 36 (FIGS. 1, 4, 16), four in number, are positioned between the preferably metallic lower or bottom ring 38, which is welded or otherwise secured to the top of the extended rod portions of the raceway 10, and portions 40 and 42 comprising support ribs extending axially in cut-out section 19 of raceway section 12 (FIGS. 13, 14 and 16) and the similar ring 44 positioned atop the intumescent rings 30-36 and connected to the lower slip ring 38 so as to extend about cut-out section 19, the sides of barrier 18, and raceway section 10. Intumescent rings 30-36 create a seal for the cables in the upper portion of the device and screws or other fastening means (FIGS. 1, 11) may be passed through small openings in the intumescent ring group 30-36 and in the upper and lower rings 44 and 38 (FIGS. 1, 11, 12), aligning the parts and securing them together in registration.

Figures 9, 10:
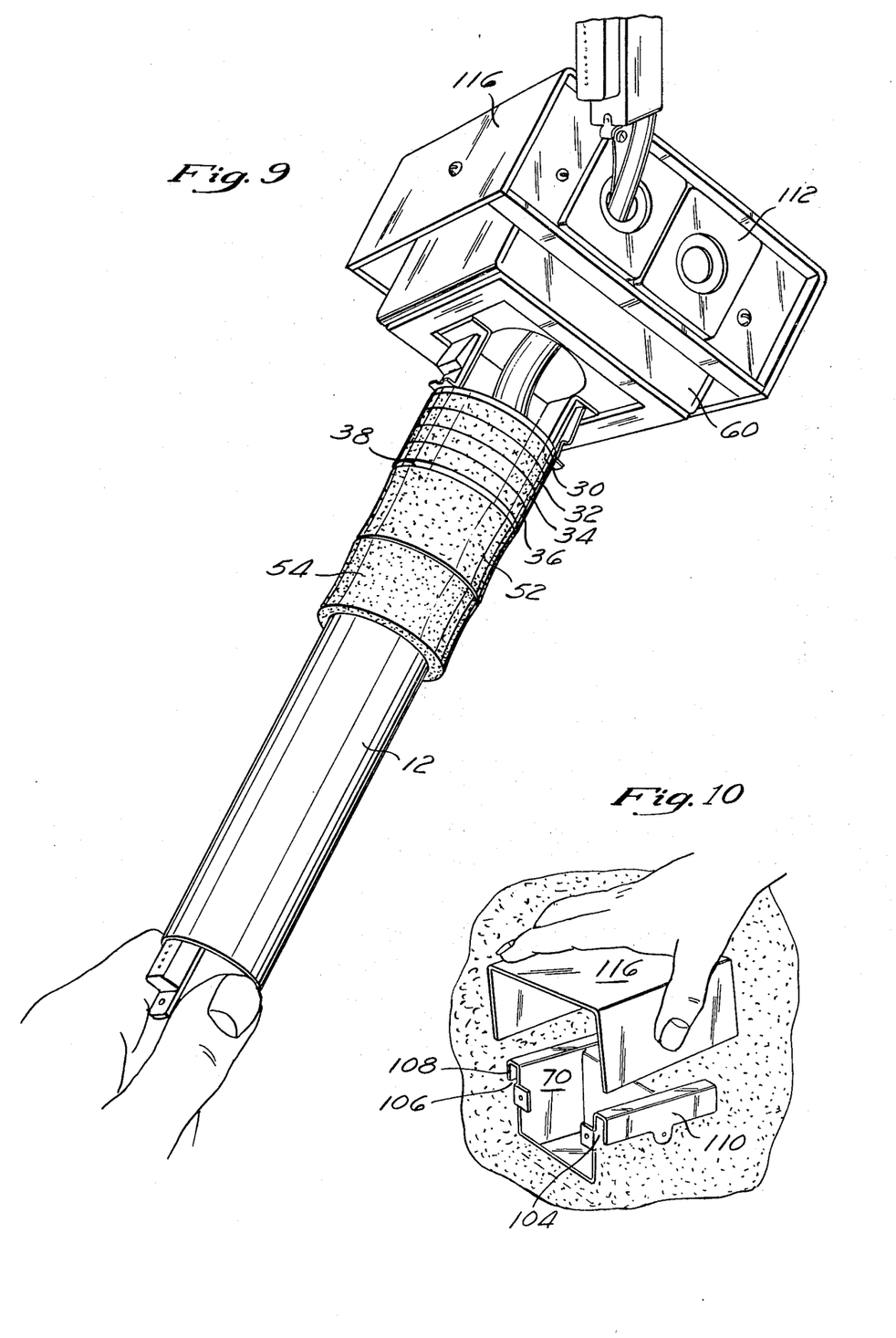
FIG. 9 is a perspective view of the insert device shown with a multi-cable unit inserted therethrough.
FIG. 10 is a perspective view, showing rug tabs, formed by making an "H" shaped slit in a rug at the point of installation of the device, positioned into tab-receiving channels formed at the upper end of the device.

Upper insert disc vapor closure means are provided above the upper slip ring 44 (FIGS. 1, 7), such as intumescent discs 46, 48 (FIG. 17) between the intumescent rings 30-36 above described and the service head 50. Further intumescent rings or sleeves 52, 54 (FIGS. 1, 4, 9) may be wrapped around the raceways below the intumescent discs 30-36.

The intumescent material, when subjected to extremes of heat of flames, expands inwardly toward the center to seal the cables and expands outwardly to seal the device in the concrete 25.

Figures 1, 2, 3:
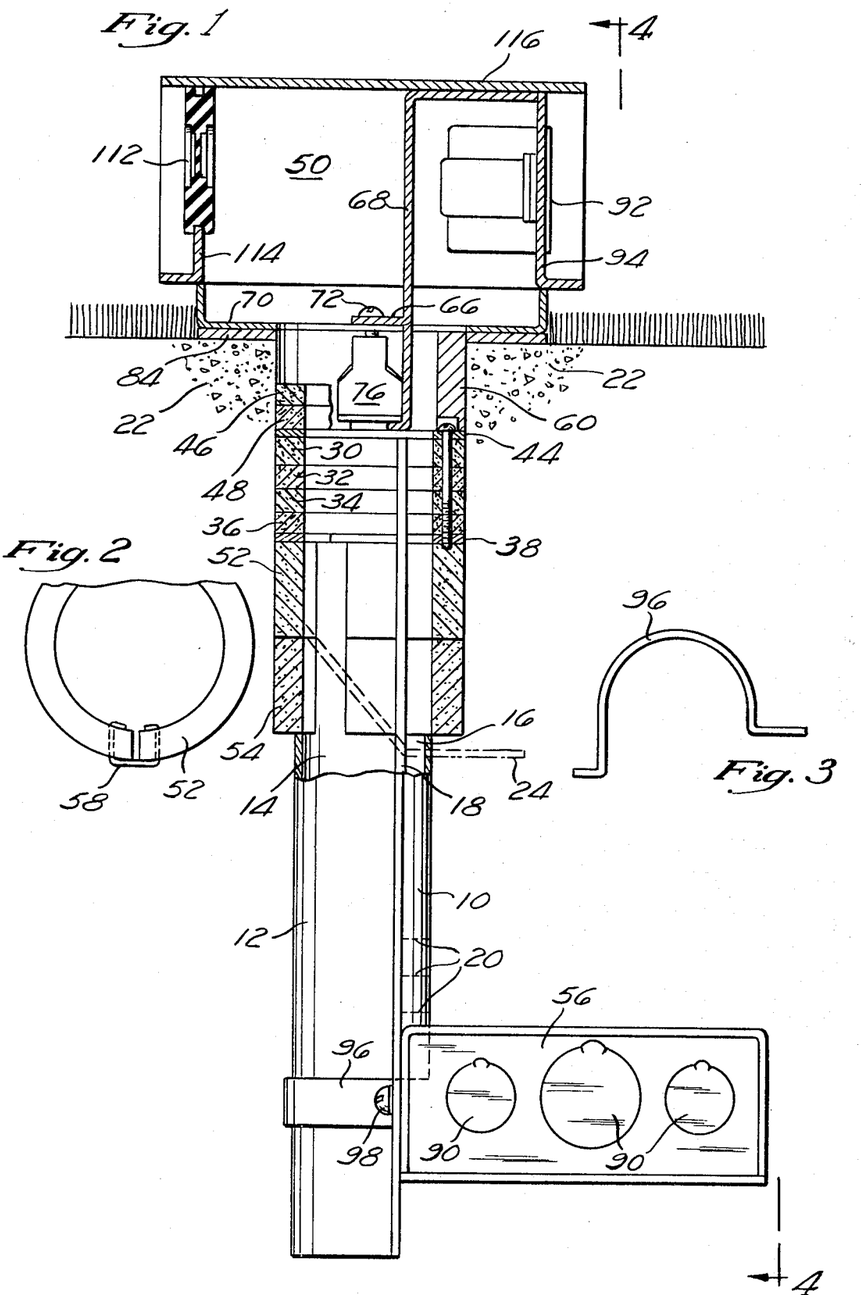
FIG. 1 is a side elevational view of an electrical insert device of the invention, taken at line 1—1 of FIG. 4.
FIG. 2 is a fragmentary plan view of an intumescent ring used therein.
FIG. 3 is an end elevational view of a strap connecting the junction box to the insert body member.
Figures 4, 5, 6, 7, 8:
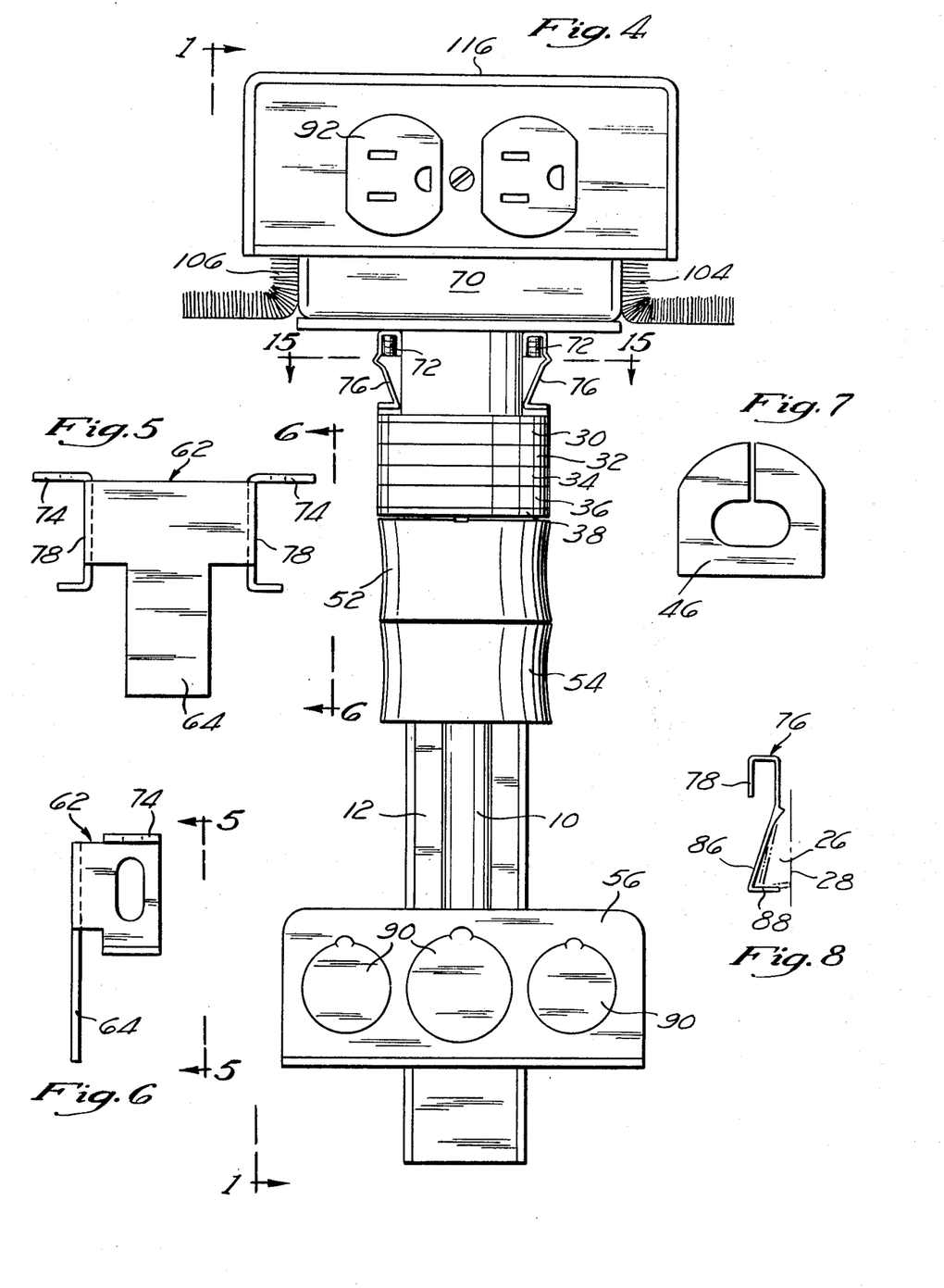
FIG. 4 is a side elevational view, taken at line 4—4 of FIG. 1.
FIG. 5 is an elevational view of a barrier and lock member taken at line 5—5 of FIG. 6.
FIG. 6 is a side elevational view thereof, taken at line 6—6 of FIG. 5.
FIG. 7 is a top plan view of an upper insert vapor closure intumescent plate.
FIG. 8 is a side elevational view of a spring-lock member.

Separation of the cable in the raceways 10, 12 is continuous from the lower end junction box 56 to the service head 50 (FIGS. 1, 4). The intumescent material rings 30-36 and 52, 54 may be formed by stamping them out of intumescent or sheet or strip material such as, for example and without limitation, intumescent material FS-195 of Technical Ceramic Products Division of 3M, a rubberized material or other material that intumesces in every direction when thermally activated. it does not degrade at high temperatures and maintains its form and is mechanically strong, and does not break down or deteriorate when subjected to water pressure. The intumescent sleeves 52, 54 may be formed of such or other intumescent material in rubberized form. In strip form, the ends of the strips are secured together by suitable means such as (FIG. 2) staples 58. In the rubberized form the sleeves such as 52, 54 (FIG. 1) may be readily slid, to position them along the raceways.

The power raceway extension member 60 (FIGS. 1, 17) may be formed of any suitable fire-and-heat resistant protection materials with low thermal conductivity positioned (FIG. 1) atop the upper ring 44, sealing the cables from the concrete floor area 22.

The separation of cables in the raceways is further continued by the barrier-lock member 62 (FIGS. 5, 6, 17) which has a depending medial barrier portion 64 which enters into the medial opening of intumescent discs 30-36, on securing the barrier-lock member 62 to the service head 50. The slotted tabs 66 of barrier 68 register with the head base pan plate 70 which is of the form (FIGS. 4, 10, 18) of a hollow, upwardly opening pan through which the bolts 72 (FIG. 17) pass for engagement with the upper, threaded tabs 74 (FIGS. 5, 6) of barrier-lock member 62. The Z-shaped spring-locking members 76 (FIGS. 8, 17) are positioned in the C-shaped portions 78 (FIG. 17) of barrier-lock member 62. The hook-shaped upper ends 80 (FIG. 17) of the Z-shaped spring members 76 have aperture portions 82 through which bolts 72 freely pass. The device may be mounted on a gasket 84 (FIG. 1). On rotation of bolts 72, the lower ends of the bolts contact the angular medial portions 86 of the spring members, thereby moving the free lower ends 88 of the spring members (FIG. 8) outwardly and into locking engagement with the edges (dotted line 28) of the structural member wherein the insert device is positioned.

Figure 18:
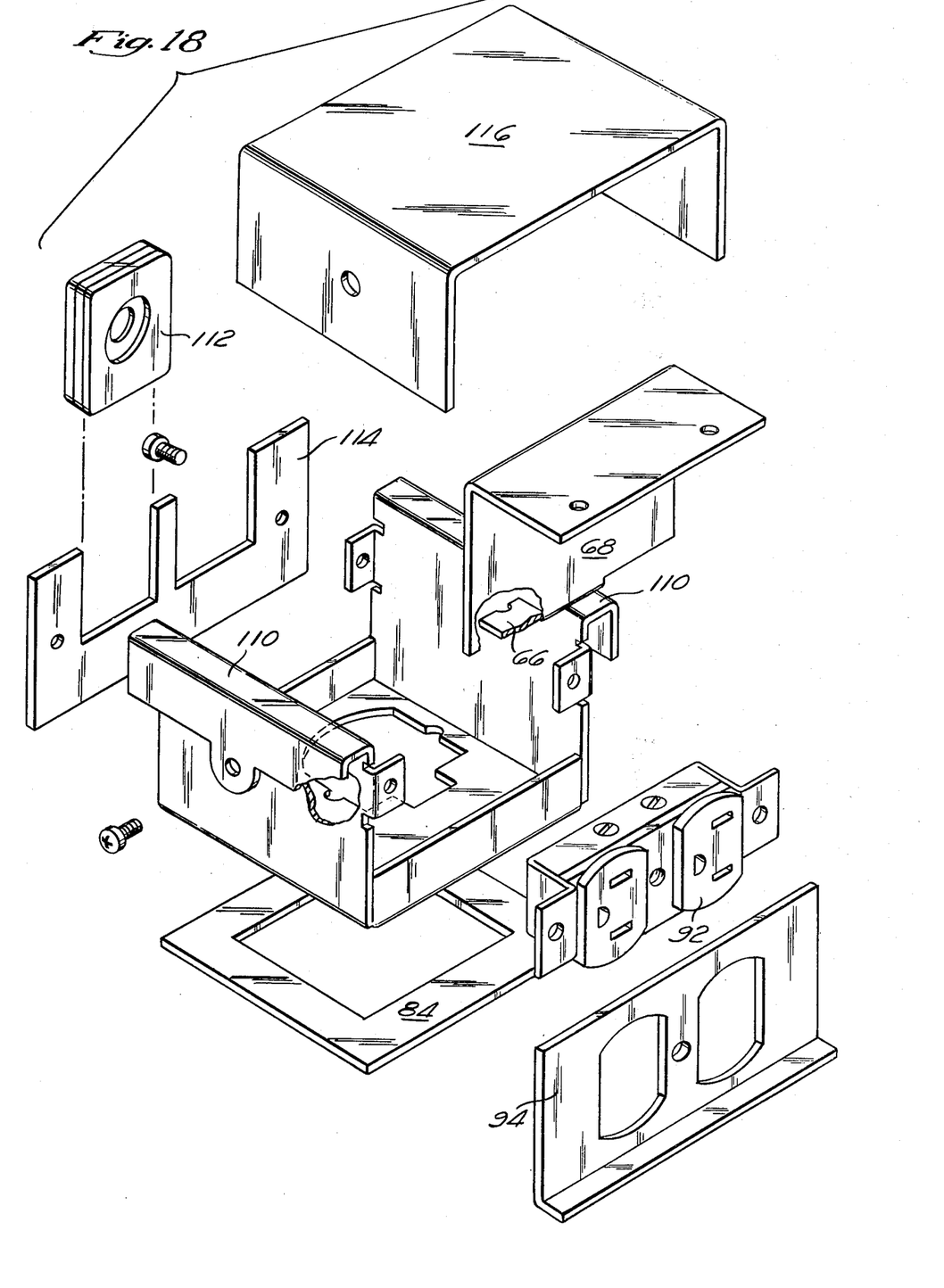
FIG. 18 is an isometric view of the service head portion of the insert device.
Figure 19:
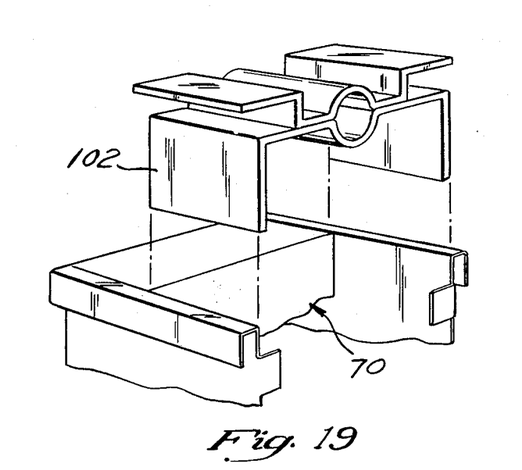
FIG. 19 is a perspective exploded view of a radiating member.

Junction box 56, positioned at a location convenient for connection with a source of cables (FIG. 4), is provided with conduits, attached to knockouts 90, through which the power cables may be passed into box 56 and the raceway 10, in the insert device, and connected, for example, to power receptacles 92 (FIG. 1) in the service head 50 face plates 94 (FIG. 18).

The lower ends of the raceways 10, 12 and junction box 56 may be connected by suitable means such as strap 96 (FIGS. 1, 3) positioned around the raceways and secured to the junction box as at 98 (FIG. 1) with a screw that is tightened to secure to the box; the other end 100 (FIG. 3) of the strap is offset and inserted into a slot or otherwise secured to the junction box 56 which may be for power cables only, providing more space and wiring capacity. A radiator 102 functions to radiate the heat, from one-hundred pair cable positioned in the radiator, into the plenum area of the service head to prevent the cable from exceeding required temperatures as it exits from the service head.

INSTALLATION OF THE DEVICE

Where a rug covers the installation site, the carpet contractor or other installer, using a template, forms an H-slit in the rug, thereby forming (FIG. 10) rug tabs 104, 106 which may be inserted into marginal, downwardly opening channels 108, 110 formed in the U-shaped base plate 70 of the service head.

The service head barrier 68 (FIG. 1) has marginal flanges 66 slotted for passage of bolts 72 (FIG. 1) therethrough. The device of the invention may be installed and locked from above the floor by one man, pushing the device into a 2" diameter hole in the cement and rotating the two screws 72 (FIG. 4) into engagement with the Z-shaped locking spring mechanism 76, whose upper end 80 is U-shaped for captivation in portions 78 of part 62; on rotation, bolts 72 contact the medial angled portions 86 (FIG. 8) of spring 76 and move the lower end 88 of the locking spring device 76 into locking engagement (FIG. 8) with the edge 28 of the hole formed in the cement floor 22 to receive the device as further above described. The installer can readily slide the junction box 56 (FIGS. 1, 4) from below the floor; it has the strap 96 (FIGS. 1, 3) for attachment after the device is in the floor opening, permitting the installer to move the junction box up and tighten it from below (the insert device having already been locked into the concrete floor from above). The preferred communication unit can be inserted (FIG. 9) through the device in simple fashion, from above if cable only, or from below if the cable has an amphenol connector attached. The device may be provided with modular wire adaptors.

This invention has been set forth exemplarily above in the disclosure of preferred embodiments; variations of the disclosures herein suggested to those skilled in the art shall be deemed to be within the spirit and scope of this invention, which should be broadly construed within the spirit and scope of the following claims.

I claim:

1. In an electrical insert device for insertion into an opening formed in a structure and enabling passage therethrough of electrical function cables, said insert device including an upper end, and comprising:

an elongated raceway formed in said insert device for said passage of cables therethrough, said cable raceway having an end opening toward said upper end of the insert device, a flexible tubular intumescent ring section proportioned to be snugly positioned on said raceway and intumescing upon exposure to heat, thereupon expanding in different directions and sealing the raceway and cables therein against heat and smoke, and being resistant to moisture attack and degradation, bracket means, to which the service head member is connectable, locking means positioned on said bracket means, and means movably positioned in said bracket means and engagable with said locking means for movement of the latter into locking engagement with the structural opening to lock the insert device therein, said locking means being of generally Z-shaped cross-section, said means so movably positioned in said bracket means so engaging the locking means generally intermediate its length for said movement thereof.

2. A device for enabling power and communication cables to be separately pulled therethrough and through a concrete slab floor in which the device is adapted to be mounted, for connection of the power and communication cables from under the floor to separate outlets therefor in a service fitting for the cables, to which the device is adapted to be connected, to activate the service fitting, which device is adapted to be inserted into a hole to be formed through the floor after setting of the concrete in the floor, and to be engagable with the wall of the hole in the floor, and further adapted to prevent heat transmission through the device or through the hole to be formed in the floor, so as to restore the fire rating of the floor with the hole formed therein to substantially the fire rating of the floor without the hole formed therein, to enable the device to be fire-rated, comprising:

(a) an elongated hollow housing, generally tubular shaped, the outside diameter of which is less than the diameter of the hole to be formed through the floor, the hollow portion of which is adapted to enable the cables to be pulled therethrough, which includes a first elongated barrier portion, extending axially therethrough for substantially the length thereof, which housing further includes first and second opposed ends, and first and second opposed end sections;

(b) first hollow means connected to the first end of the hollow housing for preventing transmission of heat through the device or through the hole to be formed in the floor, so as to restore the fire rating of the floor with the hole formed therein to substantially the fire rating of the floor without the hole formed therein, adapted to enable the cables to be pulled therethrough;

(c) means for connecting the first hollow means to the first end of the housing;

(d) means for extending the length of the housing barrier beyond the first end of the housing, adapted to be connectable to the service fitting, including a second elongated barrier portion adapted to extend through the hollow portion of the first hollow means and into barrier extending relation to the first elongated portion in the housing barrier, including means for enabling the barrier extending portion to be connected to the service fitting; and (e) means for engaging the wall of the hole to be formed through the floor, adapted to be connectable to the barrier extending means and engageable by the connection enabling means so as to be movable generally radially outwardly into engagement with the wall of the hole to be formed in the floor.

3. A device as in claim 2, in which the first end of the housing includes a cut-out section, extending circumferentially thereabout substantially from one side of the elongated barrier portion to the other, and the device further comprises a hollow member, generally disk-shaped, comprised of intumescent material, the inside diameter of which is greater than the outside diameter of the housing, the outside diameter of which is less than the diameter of the hole to be formed in the floor, adapted to be positioned so as to extend about the cut-out section in the first end of the hollow housing.

4. A device as in claim 3, in which the first end of the housing further includes a support rib extending axially in the cut-out section thereof.

5. A device as in claim 2, in which the hole wall engaging means comprise a pair of generally Z-shaped flexible strip members, adapted to be positioned on opposite sides of the barrier extendng means, each including first and second opposed end sections, and a generally rearwardly-inclined medial section, the first end section having a hole therein through which the barrier connection enabling means extend for engagement with the medial section such that the medial section is movable generally forwardly to generate corresponding generally forward movement of the second end section into engagement with the wall of the hole through the floor.

6. A device as in claim 2, in which the housing second end section includes a scored line spaced from the second end thereof so as to form a breakaway section therein.

7. A device as in claim 2, further comprising means through which the communication cables may pass, positionable in the service fitting, for radiating heat from the communication cables.

8. A device for enabling cables to be pulled therethrough and through a concrete slab floor in which the device is adapted to be mounted, for connection of the cables from under the floor, to an outlet therefor in a service fitting for the cables, to which the device is adapted to be connected, to activate the service fitting, which device is adapted to be inserted into a hole to be formed through the floor after setting of the concrete in the floor, and to be engagable with the wall of the hole in the floor, and further adapted to prevent heat transmission through the device or through the hole to be formed in the floor, so as to restore the fire rating of the floor with the hole formed therein to substantially the fire rating of the floor without the hole formed therein, to enable the device to be fire-rated, comprising:

(a) an elongated hollow housing, generally tubular shaped, the outside diameter of which is less than the diameter of the hole to be formed through the floor, the hollow portion of which is adapted to enable the cables to be pulled therethrough, which housing further includes first and second opposed ends, and first and second opposed end sections;

(b) first hollow means connected to the first end of the hollow housing for preventing transmission of heat through the device or through the hole to be formed in the floor, so as to restore the fire rating of the floor with the hole formed therein to substantially the fire rating of the floor without the hole formed therein, adapted to enable the cables to be pulled therethrough;

(c) means for connecting the first hollow means to the first end of the housing;

(d) means for extending the length of the housing beyond the first end of the housing, adapted to be connectable to the service fitting, including means for enabling the housing means to be connected to the service fitting; and (e) means for engaging the wall of the hole to be formed through the floor, adapted to be connectable to the extending means and engagable by the connection enabling means so as to be movable generally radially outwardly into engagement with the wall of the hole to be formed in the floor.

* * * * *